United States Patent [19]

Servant

[11] Patent Number: 4,850,521
[45] Date of Patent: Jul. 25, 1989

[54] DEVICE FOR THE SEALED CONNECTION OF TWO PIPE ELEMENTS

[75] Inventor: Antoine Servant, Paris, France

[73] Assignee: Societe Industrielle D'Equipment Mecanique, France

[21] Appl. No.: 34,894

[22] Filed: Apr. 3, 1987

[30] Foreign Application Priority Data

Apr. 8, 1986 [FR] France .................................. 86 05008

[51] Int. Cl.⁴ .............................................. F16J 15/12
[52] U.S. Cl. ................................. 277/167.5; 285/336; 277/236
[58] Field of Search ...................... 277/190, 191, 167.5, 277/236; 285/336, 363, 368

[56] References Cited

U.S. PATENT DOCUMENTS

| | | | |
|---|---|---|---|
| 1,715,854 | 6/1929 | McKenzie-Martyn | 285/336 X |
| 1,825,962 | 10/1931 | Laird | 277/167.5 X |
| 2,753,197 | 7/1956 | Loeffler | 285/336 |
| 2,783,106 | 2/1957 | Barnhart | 277/236 X |
| 2,898,000 | 8/1959 | Hanny | 277/167.5 |
| 3,197,218 | 7/1965 | Coulter | 277/167.5 |
| 3,217,922 | 11/1965 | Glasgow | 220/378 |
| 3,918,725 | 11/1975 | Dryer | 285/336 X |
| 4,410,186 | 10/1983 | Pierce | 277/2 |

FOREIGN PATENT DOCUMENTS 712786  7/1954  United Kingdom ................ 277/236

Primary Examiner—David Werner
Attorney, Agent, or Firm—Brumbaugh, Graves, Donohue & Raymond

[57] ABSTRACT

This invention relates to a device for the sealed connection of two pipe elements, wherein it comprises in projection on the pipe elements two members capable of being moved towards each other by at least one clamping means and of which the contiguous faces defined opposite grooves for housing a crushable seal comprising an inner toric ring of which the convexity is directed outwardly and an outer toric ring of which the convexity is directed inwardly. According to the invention, the seal is constituted solely by such rings, which abut on each other opposite the annular crests of their convex parts and the circular groove of each connecting member presents convergent bearing surfaces pressing the edges of said rings.

21 Claims, 6 Drawing Sheets

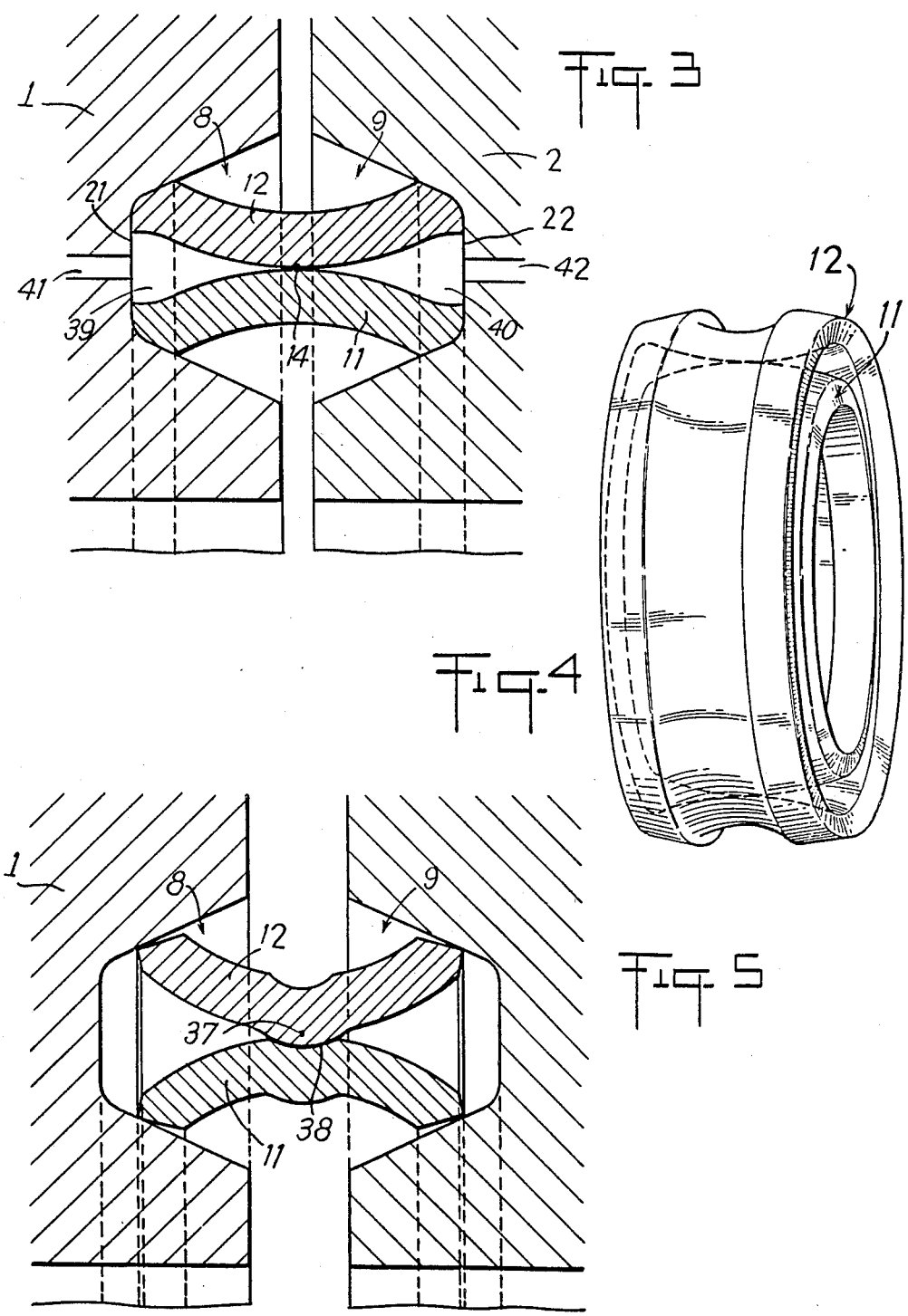

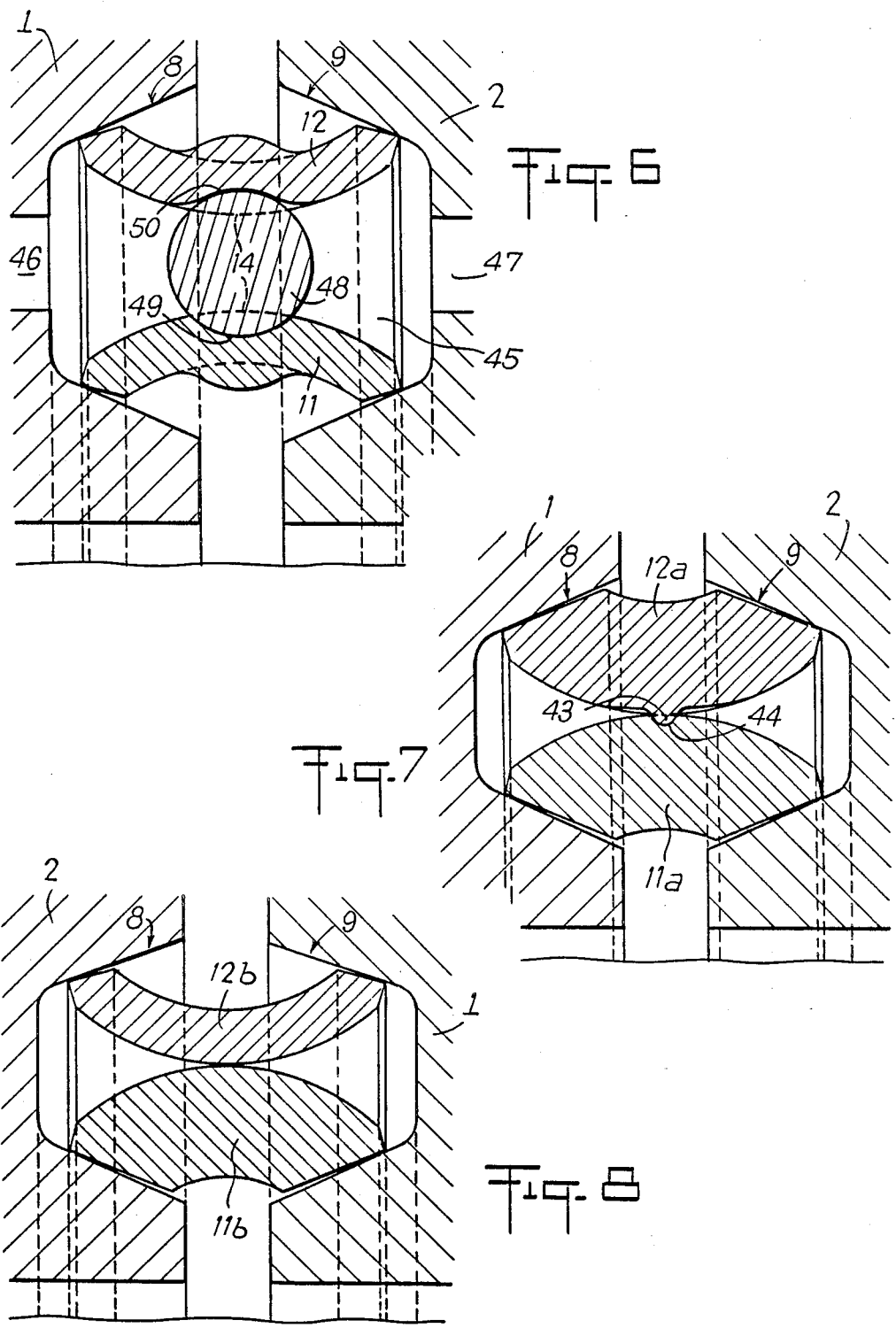

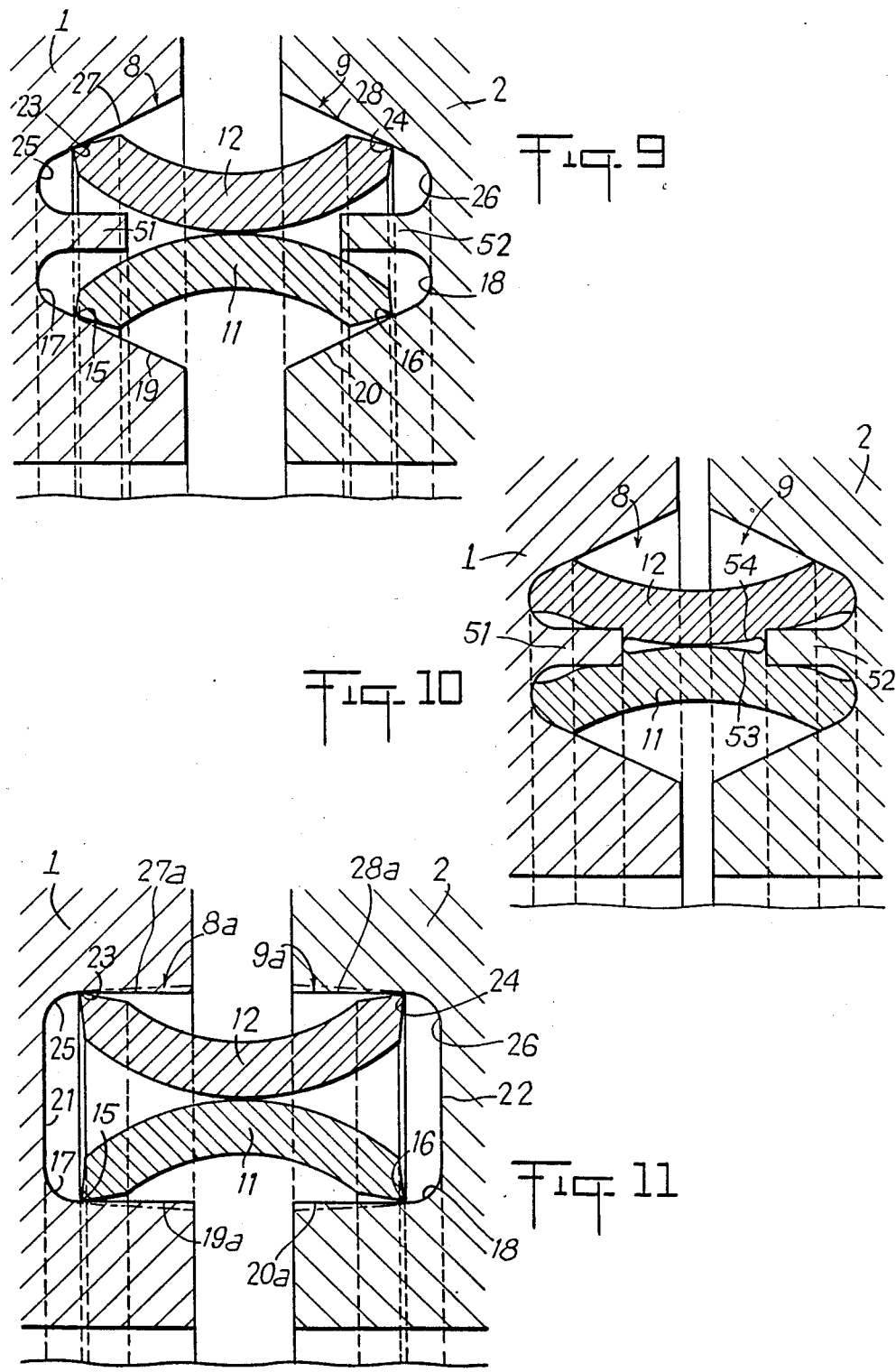

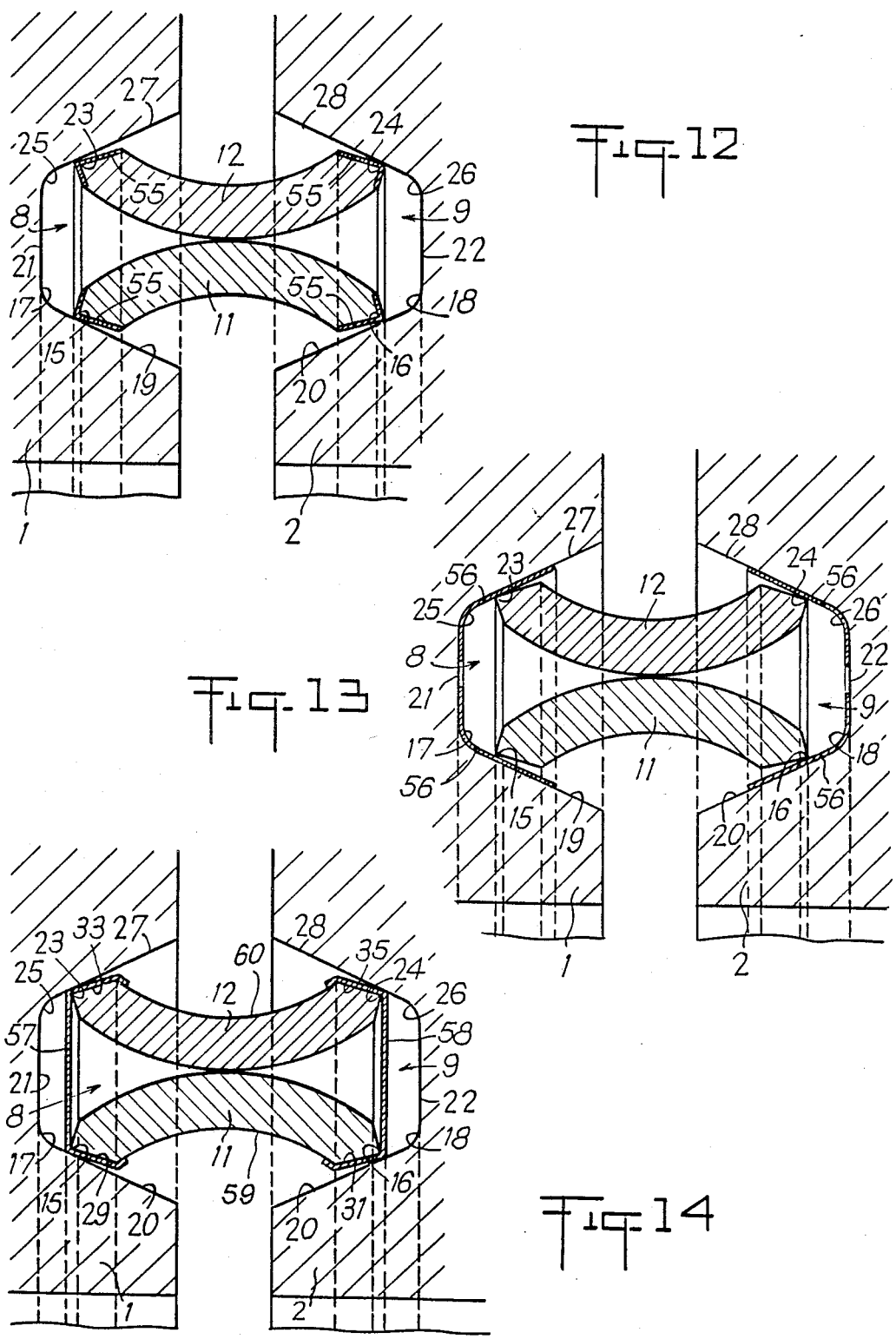

DEVICE FOR THE SEALED CONNECTION OF TWO PIPE ELEMENTS

The present invention relates to a device for the sealed connection of two pipe elements, comprising in projection thereon two members such as flanges, threaded unions or the like, capable of being brought closer to each other by at least one clamping means, the contiguous faces of these members delimiting opposite grooves concentric to the axis of said pipe for housing a crushable seal.

Seals of this type are known, particularly by U.S. Pat. Nos. 2,898,000, 3,836,159 and 3,918,725.

In U.S. Pat. Nos. 3,836,159 and 3,918,725, the seal is composite and constituted by at least one plastic ring, preferably made of polytetrafluoroethylene, interposed between two toric rings made of metal. The outer metal ring is concave, whilst the inner metal ring is convex. They are disposed concentrically with respect to each other, so as to be nearest by their annular crests and furthest apart by their marginal edges, which bear against the sides of the circular grooves of the flanges. These metal rings constitute, during clamping, containers of the plastic ring in the course of deformation; concomitantly, they form springs maintaining the plastic ring under elastic load. Tightness is therefore ensured by compression of the plastic ring and by creeping of the latter.

In U.S. Pat. No. 2,898,000, the seal is monolithic and metallic, preferably made of stainless steel. It presents in projection on a ring of flat section four lobes extending in the form of a cross. These lobes are adapted to bear by their free ends against the sides and the bottoms of the circular grooves of the flanges; they are connected to the ring by thinned parts capable of deforming elastically. Upon clamping, the central ring is subjected to a compression without deformation, whilst the thinned parts of the lobes bend outwardly and the marginal edges of said lobes are crushed, exceeding the elastic limits of deformation.

These known seals are generally satisfactory from the point of view of tightness in the particular applications for which they are intended. However, leakages appear under extreme conditions of use: high pressures, high vacuum, high temperatures, very low temperatures, vibrations, corrosive fluids, etc . . . , this all the more easily as variations of these parameters occur and produce geometrical variations in form and dimensions of the connecting members, as well as variations in internal tensions and stresses at the interfaces. Furthermore, upon dismantling, and even retightening of the bolts of the flanges, their replacement cannot be avoided. Such a replacement leads to relatively high maintenance costs, taking into account the high cost of these seals and the large number of flanges to be fitted in the installations.

It is an object of the present invention to overcome these drawbacks. It also aims at facilitating assembly of the seal, effecting a reliable, uniform crushing in its distribution, reducing bulk, simplifying machining of the connecting members and manufacture of the seal, reducing the cost price of the join, at making possible detection of the leakages, . . .

To attain this end, the present invention relates to a seal comprising two deformable toric rings which extend symmetrically with respect to a common diametral plane of the tores and concentrically to each other, the convexity of the inner ring being directed outwardly, whilst the convexity of the outer ring is directed inwardly.

The invention resides in the fact that the seal is constituted solely by such rings, which abut on each other opposite the annular crests of their convex parts, and in that the circular groove of each connecting member presents, at least near its bottom, convergent pressing bearing surfaces adapted to bring the edges of the said rings towards each other and to caulk them.

For information, German Patent Application No. 1 253 950 describes a cylinder head gasket for internal combustion engine. This gasket presents two rings of cross section in the form of arcs of circle, these rings being opposite so that they bear against each other by their crests and they bear by their lower and outer edges against the cylinder head and the engine gearbox unit.

In this known embodiment, the clamping pressure is applied perpendicularly to the parallel planes of the edges, whilst, in the present invention, it is applied in parallel.

Moreover, in this known embodiment, the rings deform by flattening and, since there is nothing to stop it, by increase of the diameter of their outer edges and decrease of the diameter of their inner edges. On the contrary, in the present invention, the outer and inner edges of the rings being hooped by the grooves of the flanges, deformation is not free and essentially different.

Under these conditions, no teaching applicable to the present invention can be drawn from this German Patent Application No. 1 253 950.

In the invention, the circular line of crest which extends in a plane perpendicular to the geometrical axis of the pipe elements and along which the toric rings are in contact is a line of abutment of these rings on each other. It is not displaced during clamping of the connecting members; each ring, by abutting on the other along this fixed line and on the convergent walls of the grooves which correspond thereto on moving together, tends to bend, in that its arcuate generatrices tend to flatten.

Consequently, during clamping of the connecting members, two phenomena appear:

on the one hand, an intense pressing force is established between the edges of the toric rings and the convergent walls of the grooves, force which ensures abutment and plastic deformation of these edges, therefore tightness of the join, on the other hand, a very considerable energy due to the elastic deformation of the tores is accumulated permanently in the rings and more especially in their central zone.

This energy is partially restored to compensate the geometrical variations in the connection due in particular to the variations in temperature (Salingré effect).

This results in the tightness being ensured during clamping, even under extreme conditions of use, and this tightness remaining during variation in the parameters mentioned above and vibrations, without the clamping having to be modified.

Furthermore, the connecting members may be dismantled and the seal re-used for re-assembly, without risk of leakages.

According to important features of the invention, the thickness of each toric ring of a seal is constant along its section in the form of circular sector.

A material less hard than that of the toric rings is interposed between the edges thereof and the pressing bearing surfaces of the grooves of the connecting members, this material being able to be metallic and preferably based on silver.

According to a particularly advantageous embodiment, the annular crests of the convex parts of the two rings are in direct contact with each other. To ensure relative positioning of the two rings during their deformation, combined recesses and bosses, preferably spherical, are formed in said two rings. The pressing bearing surfaces mentioned above are toric roundings joining the bottom of the groove of each connecting member in question to the lateral sides of this groove. In addition, each connecting member comprises a pipe connected to a leakage detection circuit and opening into the space defined by the rings in the groove of this member.

The invention will be more readily understood on reading the following description with reference to the accompanying drawings, in which:

FIGS. 2 and 3 are partial sections illustrating, on a larger scale, the section of the seal and of its bearing surfaces designated by arrow F in FIG. 1, when this seal is at rest and when it is crushed, respectively.

FIG. 4 is a perspective view of the two rings of the seal mounted in each other.

FIGS. 5 to 8 are views similar to FIG. 2, concerning other variant embodiments of the seal.

FIGS. 9 and 10 are views similar to FIGS. 2 and 3 respectively showing a second embodiment.

FIG. 11 is a view similar to FIG. 2 concerning a variant embodiment of the bearing surfaces.

FIGS. 12 to 14 are views similar to FIG. 2 illustrating several embodiments of an improvement.

Figure 1:
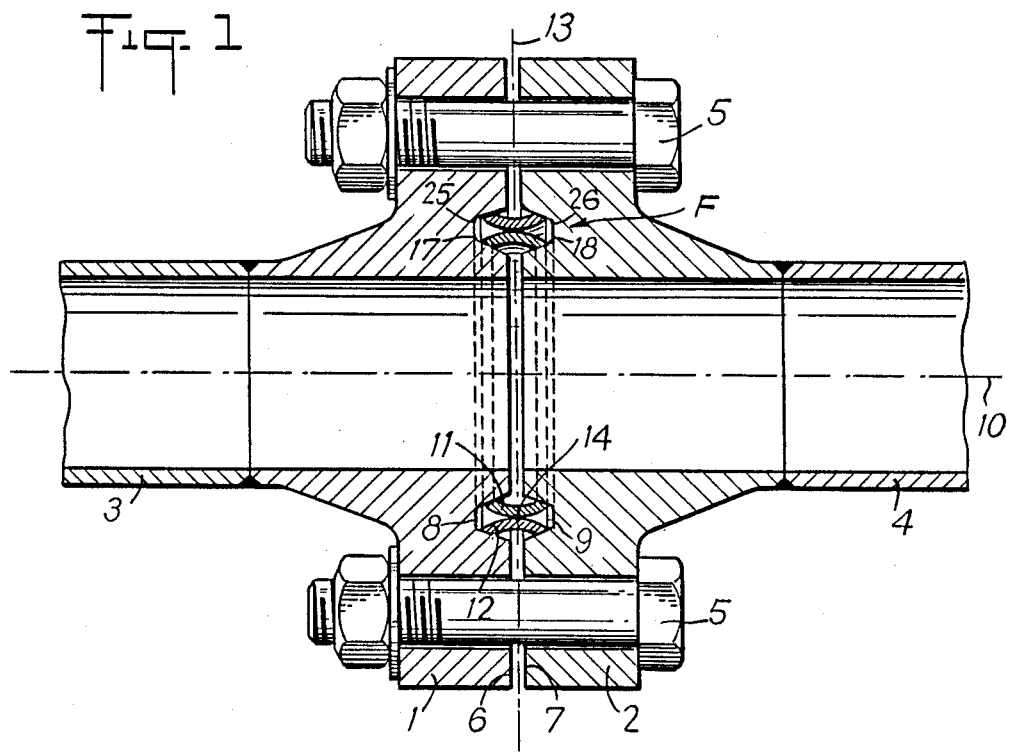
FIG. 1 is an axial section showing a first embodiment of a device according to the invention for connecting two pipe elements.

Referring now to the drawings, FIG. 1 shows the connecting device according to the invention which comprises two flanges 1, 2 adapted to be welded at the end of two pipe element 3, 4 and to be connected by clamping bolts 5. The contiguous faces 6, 7 of the flanges define opposite grooves 8, 9 concentric to the axis 10 of the elements 3, 4. In these grooves is housed a metallic seal constituted by two rings 11, 12 forming bridge between the flanges.

Figure 2:
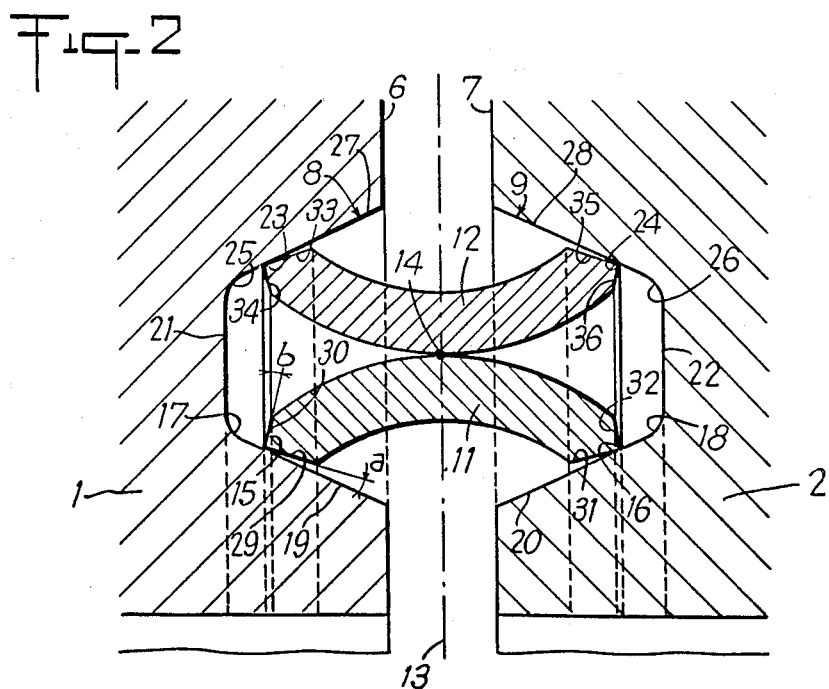

According to the first embodiment illustrated in FIGS. 2 to 4, the rings 11 and 12 are toric; they extend symmetrically with respect to a common diametral plane 13 of the tores which is perpendicular to the axis 10 mentioned above; the rings are concentric to each other, the convexity of the inner ring 11 being directed outwardly, whilst the convexity of the outer ring 12 is directed inwardly; these rings are in mutual contact by their circular crest directrix 14 lying in plane 13.

In this embodiment, the lateral edges 15 and 16 of the inner ring 11 cooperate with pressing bearing surfaces which are essentially constituted by toric roundings 17 and 18 respectively, connecting the truncated sides 19 and 20 of the grooves 8 and 9 of flanges 1 and 2 to the bottoms 21 and 22 of these grooves. Similarly, the lateral edges 23 and 24 of the outer ring 12 cooperate with pressing bearing surfaces which are essentially constituted by toric roundings 25 and 26 respectively, joining the truncated sides 27 and 28 of the grooves 8 and 9 of flanges 1 and 2 to the said bottoms 21 and 22 of these grooves. The bearing surfaces 19, 17 and 27, 25 of the groove 8 converging opposite face 6 and, similarly, the bearing surfaces 20, 18 and 28, 26 of the groove 9 converging opposite face 7 so that, by bringing flanges 1 and 2 closer to each other by means of bolts 5, these bearing surfaces provoke, as is clearly shown in FIG. 3, the plastic deformation of the edges 15 and 23, 16 and 24, respectively, at the same time as their mutual approach, which has for its effect to ensure the peripheral tightness of the rings 11 and 12, as well as a permanent contact pressure by elastic deformation of the toric surfaces in mutual abutment at their crests.

In this first embodiment (FIG. 2), the lateral edges 15, 16 and 23, 24 of the rings 11 and 12 bear against the sides 19, 20 and 27, 28 respectively of the grooves 8 and 9 before flanges 1 and 2 are clamped.

Figure 2A:
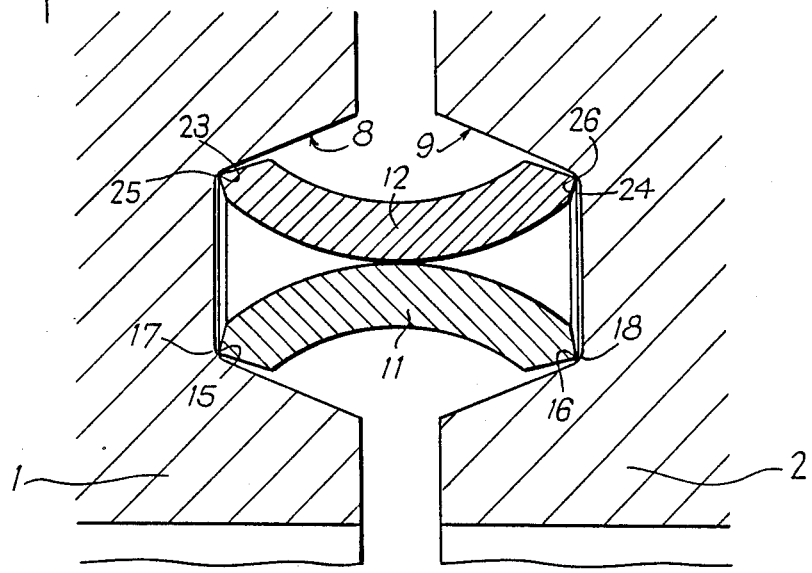
FIG. 2a is a view similar to FIG. 2 illustrating a variant embodiment.

According to the variant embodiment illustrated by FIG. 2a, the said lateral edges 15, 16 and 23, 24 bear against the toric roundings 17, 18 and 25, 26 respectively, of grooves 8 and 9 before the flanges 1 and 2 are clamped.

To promote said elastic deformation accompanied by the peripheral plastic deformation, it may be advantageous if:

the circular edge 15 of the inner ring 11 is defined by the intersection of a truncated surface 29 in front relief forming an angle "a" with the truncated side 19 of the groove 8 and of a lateral surface 30 which is preferably truncated with a relief angle "b" with the bottom 21 of this groove 8;

the circular edge 16 of the inner ring 11 is defined by the intersection of a truncated surface 32 in lateral relief;

the circular edge 23 of the outer ring 12 is defined by the intersection of a truncated surface 33 in frontal relief and a truncated surface 34 in lateral relief;

the circular edge 24 of the outer ring 12 is defined by the frontal intersection 35 and a truncated surface 36 in lateral relief.

The rings 11 and 12 may simply be in mutual contact by their common circular crest directrix 14 (FIG. 2) and they must in that case be mounted to float in the grooves 8 and 9 for them to be centred, upon clamping of flanges 1 and 2, by contact of their edges 15 and 23, 16 and 24 with the truncated sides 19 and 27, 20 and 28.

In order to facilitate assembly of the seal and to avoid possible out of square jamming during clamping, a means illustrated in FIG. 5 is employed for positioning the rings 11 and 12 with respect to each other, without hindering deformation thereof. To that end, spherical bosses 37 projecting on the inner toric surface of the outer ring 12 and spherical recesses 38 hollowed on the outer toric surface of the inner ring 11 are formed by hollowing, the bosses cooperating with the recesses and these couples of combined members 37, 38 being distributed in equiangular manner in a sufficient number.

When the seal is positioned and plastically deformed, tight chambers 39, 40 (FIG. 3) are formed between the rings 11, 12 and the bottoms 21, 22 of grooves 8, 9. If a leakage occurs, the fluid conveyed by the pipe elements 3, 4 oozes and penetrates into one, the other or both chambers. To avoid this leakage, it suffices to provide in the flanges 1 and 2 conduits 41 and 42 opening out into said chambers 39 and 40, these conduits being connected to a leakage detection circuit.

The thickness of the toric rings of the seal may, of course, be more or less large and adapted to the conditions of use.

In any case, the thickness of each ring is constant along its section in the form of a circular sector and its fiber orientation is preferably substantially parallel to the geometrical axis 10 of the pipe elements 3, 4. In this way, rings 11 and 12 may be of the same, relatively small thickness (FIG. 2), or rings 11a and 12a may be of the same, relatively large thickness (FIG. 7), or the inner ring 11b may be of considerable thickness and the outer ring 12b of small thickness (FIG. 8), or vice versa, the thick ring being located on the side where the high pressure prevails.

To effect centering in the case of the rings being thick, it is not possible to proceed by hollowing, but the projections 43 and the recesses 44 may be formed by chasing of the metal (FIG. 7) or other mode of deformation of the metal.

As shown in FIG. 6, it may be advantageous to move rings 11 and 12 apart to form therebetween a tubular passage 45 in which open out conduits 46 and 47 made in the flanges 1 and 2; these conduits are branched on one of the circuits with concentric tubes that the device connects. Rings 11 and 12 are maintained in spaced apart relationship by balls 48, preferably distributed in equiangular manner, these balls being interposed between recesses 49 and 50 hollowed in the annular crests 14 of said rings. The passage 45 is permanent between the balls which provide only a slight obstacle against the flow of the fluid coming from the branched circuit.

The plastic deformation of the edges 15, 16, 23, 24 of the rings 11, 12 is effected principally on the toric roundings 17, 18, 25, 26. Consequently and as shown by line 11, the grooves 8a, 9a may present sides 19a and 27a, 20a and 28a parallel to one another (shown in solid lines) or slightly inclined (shown in mixed lines), which may, in certain cases, facilitate assembly of the seal.

According to the second embodiment illustrated in FIGS. 9 and 10, the seal still comprises two toric rings 11 and 12 housed in two grooves 8 and 9 in the flanges. However, in this embodiment, the roundings 17 and 25 connect the truncated sides 19 and 27 to a median annular rib 51 projecting into the groove 8 between the rings; similarly, the roundings 18 and 26 connect the truncated sides 20 and 28 to a median annular rib 52 projecting into groove 9 between said rings.

As shown in FIG. 10, upon clamping of flanges 1 and 2, not only the edges 15, 16, 23 and 24 are plastically deformed in the roundings 17, 18, 25 and 26 mentioned above, but also the opposite toric faces 53 and 54 of the rings are plastically deformed on ribs 51 and 52.

Whatever the embodiment chosen, it may be advantageous to interpose between edges 15, 23 and 16, 24 of the toric rings 11, 12 and the pressing bearing surfaces 17 to 20, 25 to 28 of the grooves 8, 9 in flanges 1, 2, a material less hard than these rings and consequently more easily deformable in plastic manner than the latter. This material is generally metallic and preferably based on silver.

According to the embodiment illustrated in FIG. 12, the coating 55 based on silver is deposited or applied on the edges of the rings whilst the walls of the grooves are bereft thereof.

In accordance with the embodiment illustrated in FIG. 13, the silver-based coating 56 is deposited or coated on the toric roundings of the grooves and possibly on the sides and bottoms of said grooves, whilst the edges of the rings are bereft thereof.

Coatings 55 and 56 may, of course, exist on the border of the rings and in the grooves.

In accordance with the embodiment illustrated in FIG. 14, two floating coronal bands 57 and 58 based on silver envelop the two toric rings 11 and 12, forming an annular capsule; the band 57 surrounds the edges 15 and 23, being folded down against the truncated surfaces 29 and 33 of the rings and against the margin of their toric surfaces 59 and 60 in order to be housable in the groove 8 of the flange 1; similarly, the band 58 surrounds the edges 16 and 24, being folded down against the truncated surfaces 31 and 35 of said rings and against the margin of their toric surfaces 59 and 60 to be housable in the groove 9 of the flange 2.

In the embodiment according to FIG. 14, the lateral edges of the bands 57 and 58 bear against the sides 19, 27 and 20, 28 respectively of the grooves 8 and 9 before the flanges 1 and 2 are clamped, as is the case for the embodiment illustrated in FIG. 2.

Figure 14A:
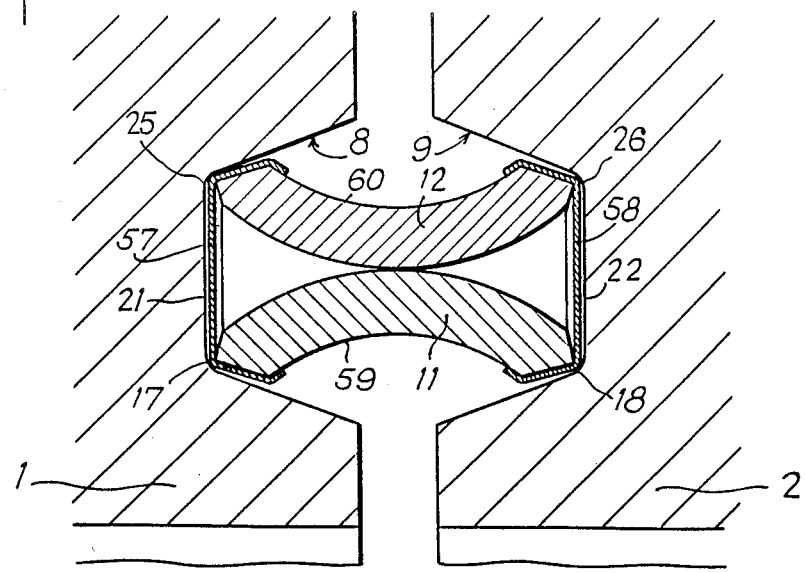
FIG. 14a is a view similar to FIG. 14 illustrating a variant embodiment.

In the embodiment according to FIG. 14a, the variant according to FIG. 2a is employed, consisting in that the lateral edges of bands 57 and 58 bear against the toric roundings 17, 25 and 18, 26, respectively, of the grooves 8 and 9 before flanges 1 and 2 are clamped.

For better understanding of the drawings, the toric rings have, of course, been shown with relatively large dimensions, but this does not exclude the general case where said rings are relatively thin.

The device as described hereinbefore is applicable to all types of connection whenever a clamping force is produced to connect the members fixed on the pipe elements. For example, flanges 1 and 2 may be replaced by the tapped and threaded parts of a screwed union.

What is claimed is:

1. A device for the sealed connection of two pipe elements comprising first and second pipe members having contiguous faces defining opposite circular grooves concentric to the axis of said pipe members; at least one clamping means disposed such that it can urge said elements closer to each other; and
   a crushable seal housed in said circular grooves comprising a first inner deformable toric ring and a second outer deformable toric ring, both rings extending symmetrically with respect to as common diametral plane of the tores and concentrically to each other such that a convexity of the inner ring is directed outwardly and a convexity of the outer ring is directed inwardly and such that when said pipe elements are urged together by said clamping means said rings abut each other opposite the annular crests of their respective convex portions and said circular grooves having, at least near their bottoms, convergent pressing bearing surfaces adapted to bring the rings toward each other at their edges and to deform them plastically on their periphery.

2. The device of claim 1, wherein said rings are made of metal and a material less hard than that of the toric rings is interposed between the edges thereof and the pressing bearing surface of the grooves of the connecting members, this material being made of metal and preferably based on silver.

3. The device of claim 2, wherein the interposed material is applied on the edges of the toric rings.

4. The device of claim 2, wherein the interposed material constitutes two floating coronal bands surrounding the edges of the toric rings contiguous to the two grooves, respectively.

5. The device of claim 2, wherein the interposed material is applied in the grooves of the pipe members.

6. The device of claim 2, wherein the interposed material is applied both on the edges of the toric rings and in the grooves of the pipe members.

7. The device of claim 1, wherein each of toric ring is in the form of a circular sector of constant thickness.

8. The device of claim 7, wherein a fiber orientation of each toric ring is substantially parallel to the axis of the pipe elements.

9. The device of claim 1, wherein the annular crests of the convex parts of the two rings are in direct contact with each other.

10. The device of claim 9, wherein each connecting member comprises a pipe connected to a leakage detection circuit and which opens out in a space defined by the rings in the groove.

11. The device of claim 1, wherein the pressing bearing surfaces are toric roundings connecting the bottom of the groove of each connecting member to the lateral sides of the groove.

12. The device of claim 11, wherein the pressing bearing surfaces comprise, in addition to the toric roundings, lateral sides of the groove which are truncated and diverge up to the face of the connecting member on which the groove opens out.

13. A device for the sealed connection of two pipe elements comprising first and second pipe members having contiguous faces defining opposite circular grooves concentric to the axis of said pipe members; at least one clamping means disposed such that it can urge said elements closer to each other; and
  a crushable seal housed in said circular grooves comprising a first inner deformable toric ring and a second outer deformable toric ring, both rings extending symmetrically with respect to a common diametral plane of the tores and concentrically to each other such that a convexity of the inner ring is directed outwardly and a convexity of the outer ring is directed inwardly, said rings having recesses and bosses formed therein and abutting each other opposite the annular crests of their respective convex portions by direct contact between said annular crests and said circular grooves having, at least near their bottoms, convergent pressing bearing surfaces adapted to bring the rings toward each other at their edges and to deform them plastically on their periphery, the relative positioning of the rings during deformation being aided by the combination of said recesses and bosses in said seal.

14. The device of claim 13, wherein each connecting member comprises a pipe connected to a leakage detection circuit and which opens out in a space defined by the rings in the groove.

15. A device for the sealed connection of two pipe elements comprising first and second pipe members having contiguous faces defining opposite circular grooves concentric to the axis of said pipe members; at least one clamping means disposed such that it can urge said elements closer to each other; and
  a crushable seal housed in said circular grooves comprising a first inner deformable toric ring and a second outer deformable toric ring, both rings extending symmetrically with respect to a common diametral plane of the tores and concentrically to each other such that a convexity of the inner ring is directed outwardly and a convexity of the outer ring is directed inwardly, said rings abutting each other opposite the annular crests of their respective convex portions, a plurality of equiangularly disposed balls being interposed between recesses formed in the annular crests, and said circular grooves having, at least near their bottoms, convergent processing bearing surfaces adapted to bring the rings toward each other at their edges and to deform them plastically on their periphery.

16. The device of claim 15, wherein the connecting members comprise internal conduits branched on one of a plurality of circuits with concentric tubes and opening out in the passage defined by the rings between the balls in the opposite grooves of the members.

17. A device for the sealed connection of two pipe elements comprising first and second pipe members having contiguous faces defining opposite circular grooves concentric to the axis of said pipe members; at least one clamping means disposed such that it can urge said elements closer to each other; and
  a crushable seal housed in said circular grooves comprising a first inner deformable toric ring and a second outer deformable toric ring, both rings extending symmetrically with respect to a common diametral plane of the tores and concentrically to each other such that a convexity of the inner ring is directed outwardly and a convexity of the outer ring is directed inwardly, said rings abutting each other opposite the annular crests of their respective convex portions and said circular grooves having convergent pressing bearing surfaces comprising toric roundings connecting a bottom of the groove of each connecting member to the lateral sides of the groove, and annular rib projecting from the bottom of the groove to penetrate, at the end of the clamping stroke, into the inner and outer rings, said bearing surfaces adapted to bring the rings toward each other at their edges and to deform them plastically on their periphery.

18. A device for the sealed connection of two pipe elements comprising first and second pipe members having continuous faces defining opposite circular grooves concentric to the axis of said pipe members; at least one clamping means disposed such that it can urge said elements closer to each other; and
  a crushable seal housed in said circular grooves comprising a first inner deformable toric ring and a second outer deformable toric ring, both rings extending symmetrically with respect to a common diametral plane of the tores and concentrically to each other such that a convexity of the inner ring is directed outwardly and a convexity of the outer ring is directed inwardly, said rings abutting each other opposite the annular crests of their respective convex portions and said circular grooves having convergent pressing bearings surfaces comprising toric roundings connecting a bottom of the groove of each connecting member to the lateral sides of the groove which are truncated and diverge up to the face of the connecting member on which the groove opens out and an annular rib projecting from the bottom of the groove to penetrate, at the end of the clamping stroke, into the inner and outer rings adapted to bring the rings toward each other at their edges and to deform them plastically on their periphery.

19. A device for the sealed connection of two pipe elements comprising first and second pipe members having contiguous faces defining opposite circular grooves concentric to the axis of said pipe members; at least one clamping means disposed such that it can urge said elements closer to each other; and a crushable seal housing in said circular grooves comprising a first inner deformable toric ring and a second outer deformable toric ring, the rings being defined by truncated surfaces of a slope less than that of truncated sides of the grooves with respect to the pipe axis, both rings extending symmetrically with respect to a common diametral plane of the tores and concentrically to each other such that a convexity of the inner ring is directed outwardly and a convexity of the outer ring is directed inwardly, said rings abutting each other opposite the annular crests of their respective convex portions and said circular grooves having convergent pressing bearing surfaces comprising toric roundings connecting a bottom of the groove of each connecting member to the lateral sides of the groove which are truncated and diverge up to the face of the connecting member on which the groove opens out, said bearing surfaces adapted to bring the rings toward each other at their edges and to deform them plastically on their periphery.

20. A device for the sealed connection of two pipe elements comprising first and second pipe members having contiguous faces defining opposite circular grooves concentric to the axis of said pipe members; at least one clamping means disposed such that it can urge said elements closer to each other; and a crushable seal housed in said circular grooves comprising a first inner deformable toric ring and a second outer deformable toric ring, both rings extending symmetrically with respect to a common diametral plane of the tores and concentrically to each other such that a convexity of the inner ring is directed outwardly and a convexity of the outer ring is directed inwardly, said rings abutting each other opposite the annular crests of their respective convex portions and said circular grooves having convergent pressing bearing surfaces comprising toric roundings connecting a bottom of the groove of each connecting member to the lateral sides of the groove, said bearing surfaces adapted to bring the rings toward each other at their edges and to deform them plastically on their periphery, said rings being defined by truncated surfaces in lateral relief which converge toward the edge of the rings with the bottom of the grooves when the rings are housed in the grooves in the non-clamped state.

21. A device for the sealed connection of two pipe elements comprising first and second pipe members having contiguous faces defining opposite circular grooves concentric to the axis of said pipe members; at least one clamping means disposed such that it can urge said elements closer to each other; and a crushable seal housed in said circular grooves comprising a first inner deformable toric ring and a second outer deformable toric ring, both rings extending symmetrically with respect to a common diametral plane of the tores and concentrically to each other such that a convexity of the inner ring is directed outwardly and a convexity of the outer ring is directed inwardly, said rings abutting each other opposite the annular crests of their respective convex portions and said circular grooves having convergent pressing bearing surfaces comprising toric roundings connecting a bottom of the groove of each connecting member to the lateral sides of the groove which are truncated and diverge up to the face of the connecting member on which the groove opens out, said bearing surfaces adapted to bring the rings toward each other at their edges and to deform them plastically on their periphery, said rings being defined by truncated surfaces in lateral relief which converge toward the edge of the rings with the bottom of the grooves when the rings are housed in the grooves in the non-clamped state.

* * * * *

UNITED STATES PATENT AND TRADEMARK OFFICE
CERTIFICATE OF CORRECTION

PATENT NO. : 4,850,521
DATED : July 25, 1989
INVENTOR(S) : Antoine Servant

It is certified that error appears in the above-identified patent and that said Letters Patent is hereby corrected as shown below:

Title page following first line of FOREIGN PATENT DOCUMENTS, insert second line --1253950 11/1967 Germany--;

First page, fifth line of ABSTRACT, "defined" should read --define--;

Col. 3, line 43, "element" should be --elements--;

Col. 6, line 42, "as" should read --a--;

Col. 7, line 4, "each of" should read --each--;

Col. 8, line 32, "annular" should read --an annular--; and

Col. 8, line 54, "bearings" should read --bearing--.

Signed and Sealed this

Tenth Day of July, 1990

Attest:

HARRY F. MANBECK, JR.

*Attesting Officer*          *Commissioner of Patents and Trademarks*